(12) United States Patent
Zimmerman et al.

(10) Patent No.: US 11,427,074 B2
(45) Date of Patent: Aug. 30, 2022

(54) APPARATUSES FOR MOUNTING TANKS TO VEHICLES AND RELATED METHODS

(71) Applicant: Natural Gas Fuel Systems, LLC, Roanoke, TX (US)

(72) Inventors: Michael Zimmerman, Trophy Club, TX (US); Christopher Culberson, Denton, TX (US)

(73) Assignee: NATURAL GAS FUEL SYSTEMS, LLC, Roanoke, TX (US)

( * ) Notice: Subject to any disclaimer, the term of this patent is extended or adjusted under 35 U.S.C. 154(b) by 0 days.

(21) Appl. No.: 16/139,513

(22) Filed: Sep. 24, 2018

(65) Prior Publication Data

US 2019/0263260 A1 Aug. 29, 2019

Related U.S. Application Data

(63) Continuation of application No. 15/145,115, filed on May 3, 2016, now Pat. No. 10,081,243.

(60) Provisional application No. 62/156,319, filed on May 3, 2015.

(51) Int. Cl.
| | | |
|---|---|---|
| *B60K 15/067* | (2006.01) | |
| *B60K 15/07* | (2006.01) | |
| *F16F 15/04* | (2006.01) | |
| *B60K 15/03* | (2006.01) | |
| *B60K 15/063* | (2006.01) | |

(52) U.S. Cl.
CPC ............ *B60K 15/067* (2013.01); *B60K 15/07* (2013.01); *F16F 15/04* (2013.01); *B60K 2015/03453* (2013.01); *B60K 2015/0636* (2013.01); *B60Y 2200/14* (2013.01); *F16F 2230/0005* (2013.01)

(58) Field of Classification Search
CPC .......... B60K 15/067; B60K 2015/0675; B60K 15/07; B60K 2015/03453; B60K 15/04; B60K 2015/0636; F16F 2230/0005; F16M 7/00; B60P 3/22; B60Y 2200/14
USPC ............................................. 248/202.1, 833
See application file for complete search history.

(56) References Cited

U.S. PATENT DOCUMENTS

| | | | |
|---|---|---|---|
| 5,869,746 A | | 2/1999 | Wantanabe et al. |
| 5,904,372 A | * | 5/1999 | Ito .................. B66F 9/07518 |
| | | | 187/222 |
| 5,924,734 A | | 7/1999 | Fukagawa et al. |
| 5,996,207 A | | 12/1999 | Brown et al. |
| 5,997,040 A | | 12/1999 | Fukagawa et al. |

(Continued)

*Primary Examiner* — Christopher Garft
(74) *Attorney, Agent, or Firm* — Norton Rose Fulbright US LLP

(57) ABSTRACT

Some of the present apparatuses include a frame defining first and second supports and at least a portion of a rigid tank mount laterally offset from the first and second supports, where the first support is configured to be pivotally coupled to a vehicle such that the frame is movable relative to the vehicle between a first position in which the second support is spaced apart from the vehicle and second position in which the second support is coupled to the vehicle. Some apparatuses include a frame mount having a flange defining a bounded opening configured to receive a fastener and a post extending from the flange and away from the opening, where the first support is configured to be pivotally coupled to the flange via the fastener and the second support is configured to be coupled to the post when the frame is in the second position.

14 Claims, 16 Drawing Sheets

(56) References Cited

U.S. PATENT DOCUMENTS

| | | | |
|---|---|---|---|
| 6,042,071 A * | 3/2000 | Watanabe | B60K 15/07 180/69.5 |
| 6,053,533 A * | 4/2000 | Osborn | B60K 15/067 280/830 |
| 6,086,103 A | 7/2000 | Fukagawa et al. | |
| 6,321,775 B1 | 11/2001 | Hildebrand et al. | |
| 6,347,678 B1 | 2/2002 | Osborn et al. | |
| 6,402,198 B2 | 6/2002 | Gollungberg | |
| 6,443,363 B1 * | 9/2002 | Fasano | E01B 26/005 238/121 |
| 6,536,722 B2 * | 3/2003 | Sadowski | F17C 13/084 248/154 |
| 6,672,620 B2 | 1/2004 | Kawazu et al. | |
| 6,708,719 B2 * | 3/2004 | Idoguchi | F17C 13/084 222/135 |
| 6,736,229 B1 | 5/2004 | Amori et al. | |
| 6,824,168 B2 | 11/2004 | Kawazu et al. | |
| 6,953,099 B2 | 10/2005 | Kawasaki et al. | |
| 6,986,490 B2 * | 1/2006 | Eihusen | F17C 1/00 248/312 |
| 6,986,494 B2 | 1/2006 | Strasser | |
| 7,137,474 B2 * | 11/2006 | Yokote | F17C 13/084 248/500 |
| 7,189,040 B2 | 3/2007 | Sharp et al. | |
| 7,198,124 B2 | 4/2007 | Amori et al. | |
| 7,198,301 B2 | 4/2007 | Wozniak et al. | |
| 7,249,786 B2 * | 7/2007 | Mascarenhas | B60K 15/067 280/830 |
| 7,264,277 B2 | 9/2007 | Ono et al. | |
| 7,270,209 B2 | 9/2007 | Suess | |
| 7,292,992 B2 | 11/2007 | Chernoff et al. | |
| 7,303,211 B2 | 12/2007 | Borroni-Bird et al. | |
| 7,334,818 B2 | 2/2008 | Mascarenhas et al. | |
| 7,441,615 B2 | 10/2008 | Borroni-Bird et al. | |
| 7,458,611 B2 | 12/2008 | Hashimura | |
| 7,556,113 B2 | 7/2009 | Amori et al. | |
| 7,562,788 B2 | 7/2009 | Wantanabe et al. | |
| 7,621,565 B2 | 11/2009 | Ross et al. | |
| 7,624,753 B2 | 12/2009 | Suess et al. | |
| 7,631,901 B2 | 12/2009 | Diehl | |
| 7,744,127 B2 | 6/2010 | Essinger et al. | |
| 7,770,679 B2 | 8/2010 | Takaku et al. | |
| 7,963,597 B2 | 6/2011 | Bostrom et al. | |
| 7,984,653 B2 | 7/2011 | Oelerich et al. | |
| 8,052,209 B2 | 11/2011 | Bostrom et al. | |
| 8,056,928 B2 | 11/2011 | Ijaz et al. | |
| 8,083,263 B2 | 12/2011 | Yamanami et al. | |
| 8,152,123 B2 | 4/2012 | Ziaylek et al. | |
| 8,302,997 B2 | 11/2012 | Veenstra | |
| 8,307,803 B2 | 11/2012 | Ito et al. | |
| 8,356,786 B2 | 1/2013 | Guckes et al. | |
| 8,366,152 B2 | 2/2013 | Tsubokawa | |
| 8,408,600 B2 | 4/2013 | Kondo et al. | |
| 8,418,340 B2 | 4/2013 | Koehnen et al. | |
| 8,464,766 B2 | 6/2013 | Ito et al. | |
| 8,469,324 B2 | 6/2013 | Bostrom et al. | |
| 8,480,131 B2 | 7/2013 | Schultheis et al. | |
| 8,534,403 B2 | 9/2013 | Dykstra | |
| 8,579,331 B2 | 11/2013 | Hayashi et al. | |
| 8,608,202 B2 | 12/2013 | Sow | |
| 8,672,359 B2 | 3/2014 | Ohashi | |
| 8,690,191 B2 | 4/2014 | Gentry | |
| 8,807,256 B2 | 8/2014 | Gibb et al. | |
| 8,881,933 B2 | 11/2014 | Green | |
| 8,888,059 B2 | 11/2014 | Kohnberg et al. | |
| 8,915,322 B2 | 12/2014 | Gibb et al. | |
| 8,915,682 B2 | 12/2014 | Mulanon | |
| 8,919,597 B2 | 12/2014 | Handa | |
| 8,944,469 B2 | 2/2015 | Mulanon | |
| 8,960,617 B2 | 2/2015 | Karlsson et al. | |
| 2002/0187020 A1 * | 12/2002 | Julien | F16B 1/0014 411/544 |
| 2009/0114784 A1 * | 5/2009 | Tam | F16L 3/137 24/115 R |
| 2013/0001384 A1 * | 1/2013 | Karlsson | F16B 2/065 248/214 |
| 2013/0334381 A1 * | 12/2013 | Vargo, Jr. | B60K 15/07 29/464 |
| 2014/0103628 A1 * | 4/2014 | De Biasi | B60K 15/067 280/834 |

* cited by examiner

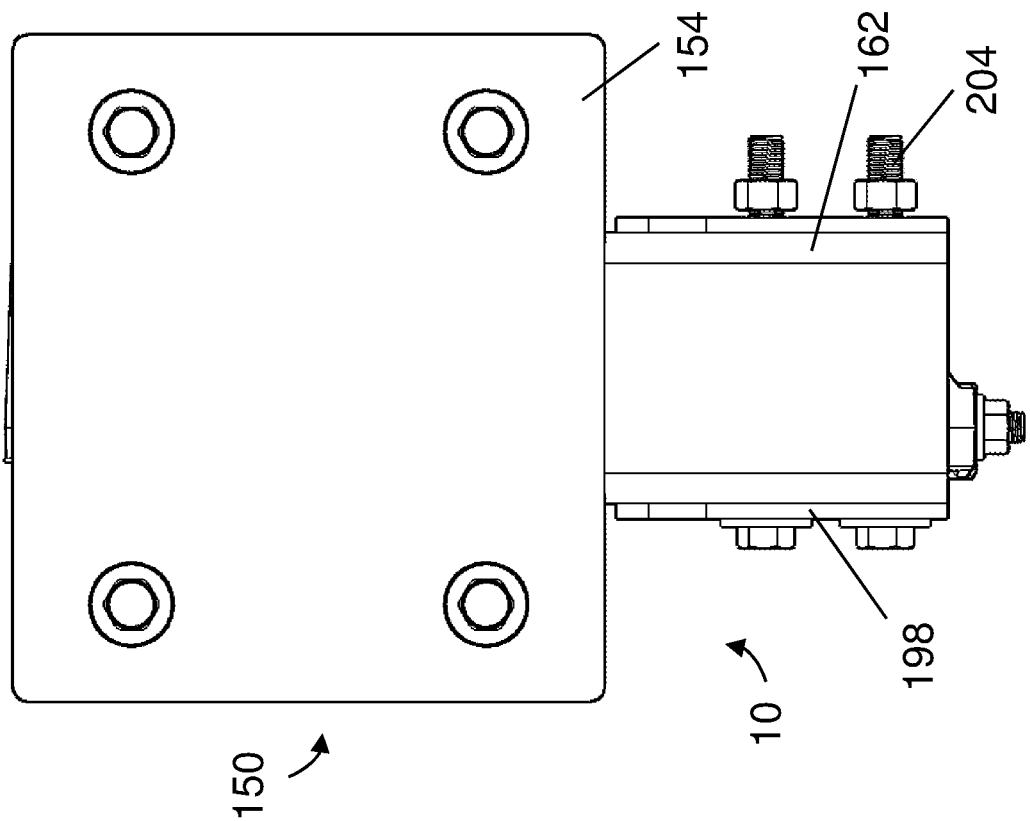
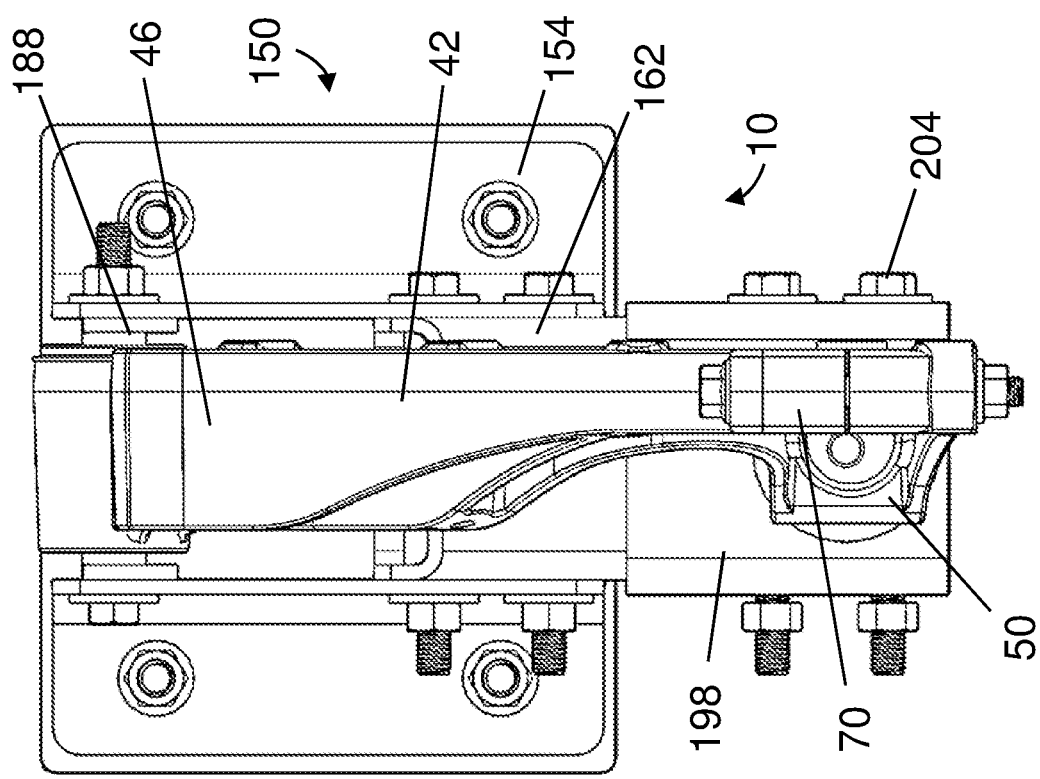
FIG. 4F
FIG. 4E

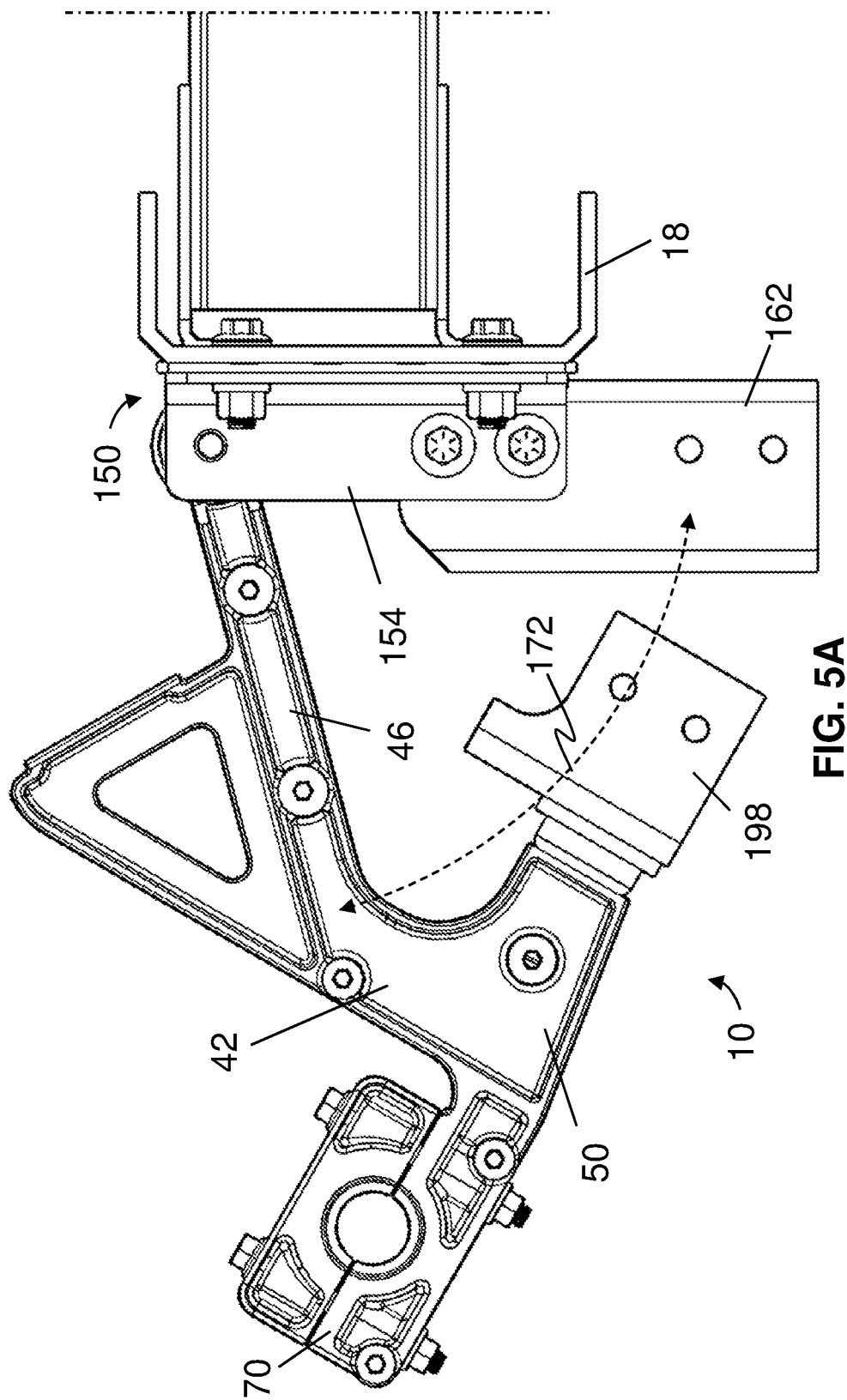

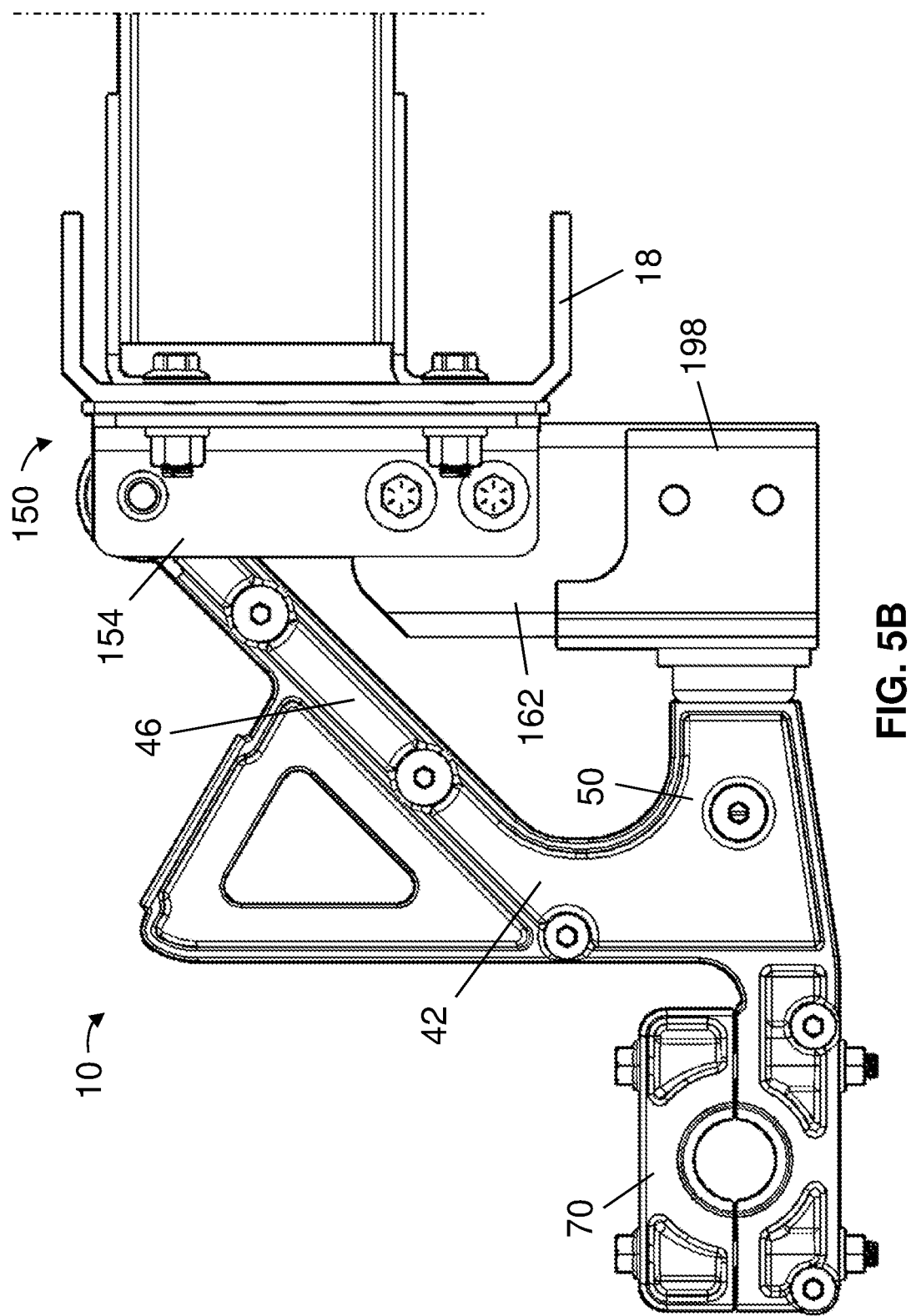

APPARATUSES FOR MOUNTING TANKS TO VEHICLES AND RELATED METHODS

CROSS-REFERENCE TO RELATED APPLICATIONS

This application is a continuation of U.S. patent application Ser. No. 15/145,115, filed on May 3, 2016, which claims priority to U.S. Provisional Patent Application No. 62/156,319, filed on May 3, 2015. The entire contents of the referenced application are incorporated into the present application by reference.

BACKGROUND

1. Field of Invention

The present invention relates generally to vehicles, and more specifically, but not by way of limitation, to apparatuses for mounting tanks, such as, for example, fuel tanks, to vehicles.

2. Description of Related Art

In some instances, it may be desirable to mount a tank, such as, for example, a fuel tank, to a vehicle (e.g., during assembly of the vehicle, when adding a tank to the vehicle, and/or the like). Some existing tank mounts may require a significant amount of time and/or effort to install the tank mount on a vehicle and/or to install a tank on the tank mount.

SUMMARY

Some embodiments of the present apparatuses for mounting a tank to a vehicle comprise: a frame defining a first support, a second support, and at least a portion of a rigid tank mount laterally offset from the first support and the second support, the tank mount configured to be coupled to a tank, where the first support is configured to be pivotally coupled to a vehicle such that the frame is movable relative to the vehicle between a first position in which the second support is spaced apart from the vehicle and a second position in which the second support is coupled to the vehicle.

In some embodiments, the first support is rigid. In some embodiments, the second support is rigid. In some embodiments, the first support comprises a cantilever support. In some embodiments, the second support comprises a cantilever support. In some embodiments, the first support is angularly disposed at a non-parallel angle relative to the second support. In some embodiments, the frame defines an opening between the first support and the second support.

In some embodiments, the frame defines a curved recess configured to correspond to an outer surface of the tank. In some embodiments, no portion of the frame extends laterally beyond the tank in a direction from the second support and towards the tank mount when the tank is coupled to the tank mount. In some embodiments, the frame tapers in a maximum thickness in a direction from the first support and towards the tank mount.

In some embodiments, the at least a portion of the tank mount is defined by the frame in fixed relation relative to the first support and the second support. In some embodiments, the tank mount defines an opening configured to surround a neck of the tank. In some embodiments, the tank mount is configured to retain the tank relative to the frame independently of the position of the frame relative to the vehicle. In some embodiments, the tank mount is configured to retain the tank relative to the frame such that a longitudinal axis of the tank is perpendicular to a direction from the first support and towards the tank mount.

Some embodiments comprise a frame mount configured to be coupled between the frame and the vehicle, the frame mount comprising a flange configured to be coupled to the vehicle, the flange defining a bounded opening configured to receive a fastener, and a post extending from the flange and away from the opening, where the first support is configured to be pivotally coupled to the vehicle via the fastener, and, when the frame is in the second position, the cantilever second support is coupled to the post.

In some embodiments, the flange defines a recess configured to receive at least a portion of the first support and the flange comprises one or more protrusions that extend from the recess, the one or more protrusions configured to support the first support relative to the flange independently of the fastener. In some embodiments, the post is tubular.

Some embodiments comprise a receiver configured to be coupled to the second support, where the receiver is configured to receive at least a portion of the post when the frame is in the second position. In some embodiments, the receiver defines a channel configured to receive at least a portion of the post. Some embodiments comprise a resilient damper configured to be coupled between the second support and the receiver.

Some embodiments comprise one or more resilient components configured to be disposed between at least of: the first support and the vehicle and the second support and the vehicle. In some embodiments, the one or more resilient components comprises a bushing configured to be disposed between the first support and the vehicle. In some embodiments, the one or more resilient components comprises a damper configured to be disposed between the second support and the vehicle. Some embodiments comprise one or more resilient components configured to be disposed between at least one of: the first support and the flange and the second support and the post. In some embodiments, the one or more resilient components comprises a bushing configured to be disposed between the first support and the flange. In some embodiments, the one or more resilient components comprises a damper configured to be disposed between the second support and the post.

Some embodiments of the present methods comprise: coupling a frame mount to a vehicle, the frame mount having a flange defining a bounded opening and a post extending from the flange and away from the opening, coupling a first support of a frame to the flange, the frame further defining a second support and at least a portion of a rigid tank mount laterally offset from the first support and the second support, and pivoting the frame relative to the vehicle to couple the second support of the frame to the post. Some embodiments comprise disposing a fastener through the opening of the flange and into the first support of the frame. Some embodiments comprise coupling a tank to the tank mount.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the term "substantially" may be substituted with "within [a percentage] of" what is specified, where the percentage includes 0.1, 1, 5, and 10 percent.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any embodiment of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the embodiment depicted in the figures.

FIGS. 4E and 4F are opposing side views of the apparatus of FIG. 1A.

FIG. 5A is a front view of the apparatus of FIG. 1A, shown with a frame in a first position relative to a vehicle.

FIG. 5B is a front view of the apparatus of FIG. 1A, shown with a frame in a second position relative to a vehicle.

DETAILED DESCRIPTION OF ILLUSTRATIVE EMBODIMENTS

Figure 1A:
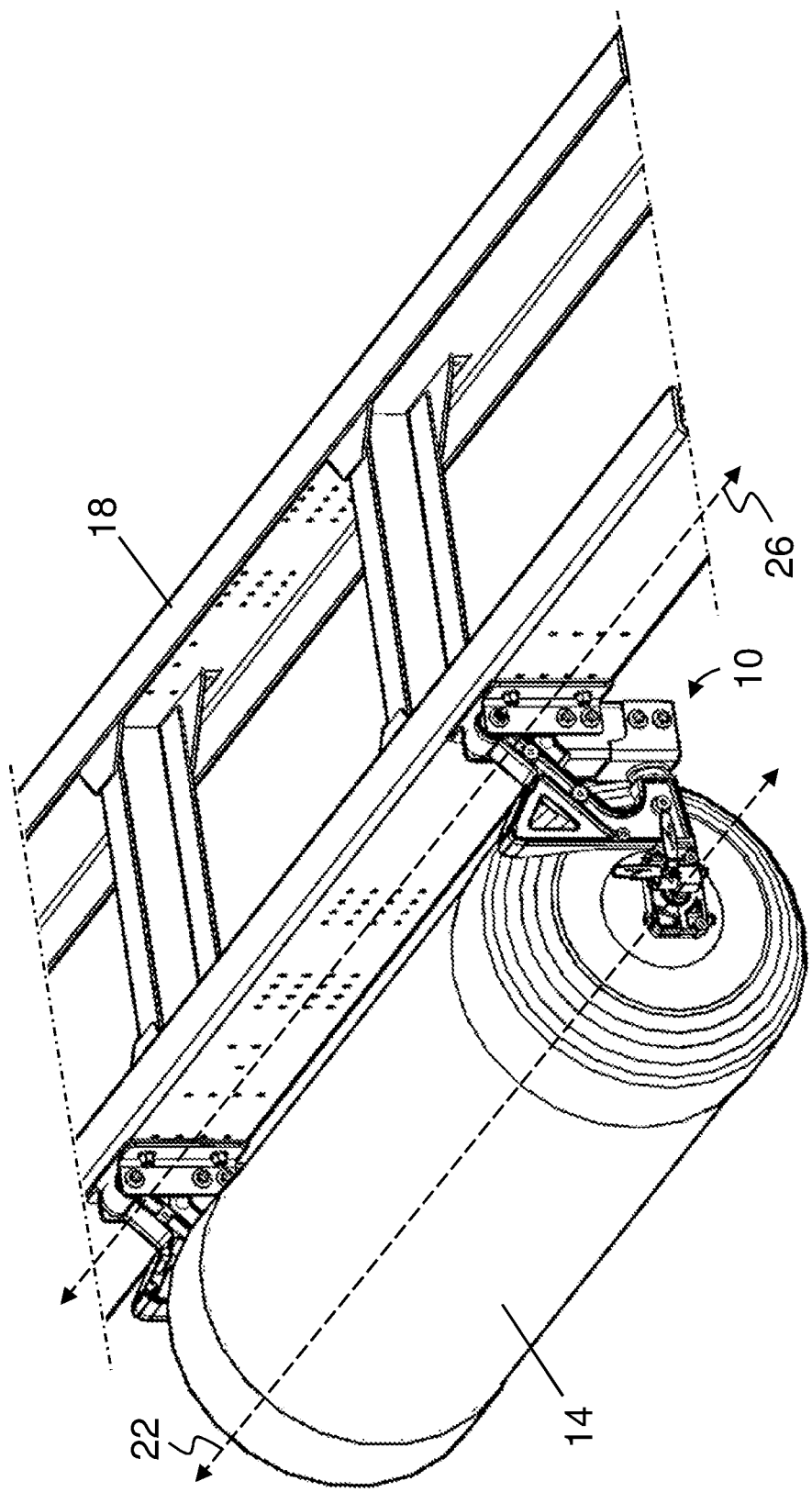
FIG. 1A is a perspective view of a first embodiment of the present apparatuses, shown with a tank and a vehicle.
Figure 1B:
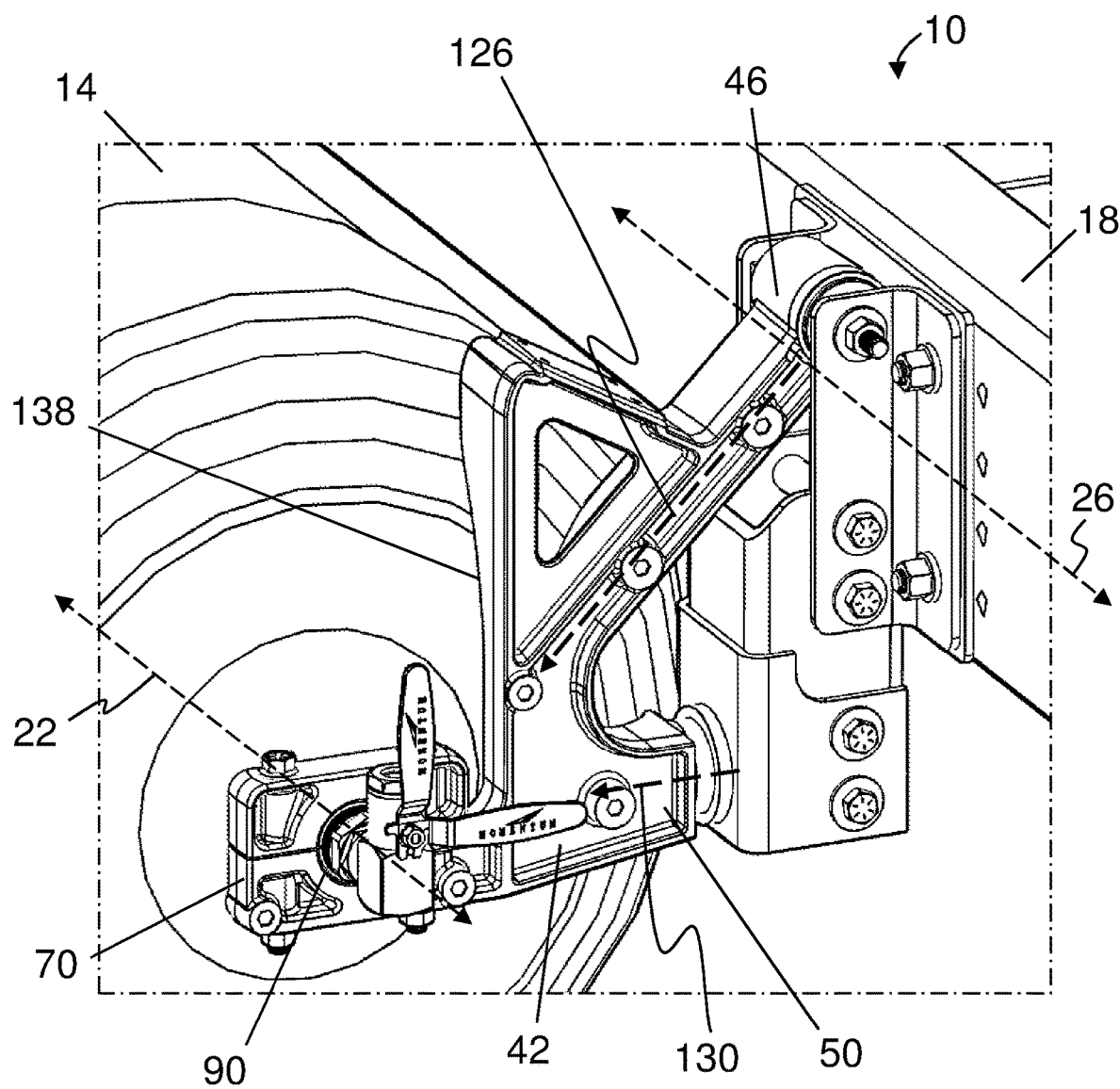
FIG. 1B is a perspective view of the apparatus of FIG. 1A.
Figure 2A:
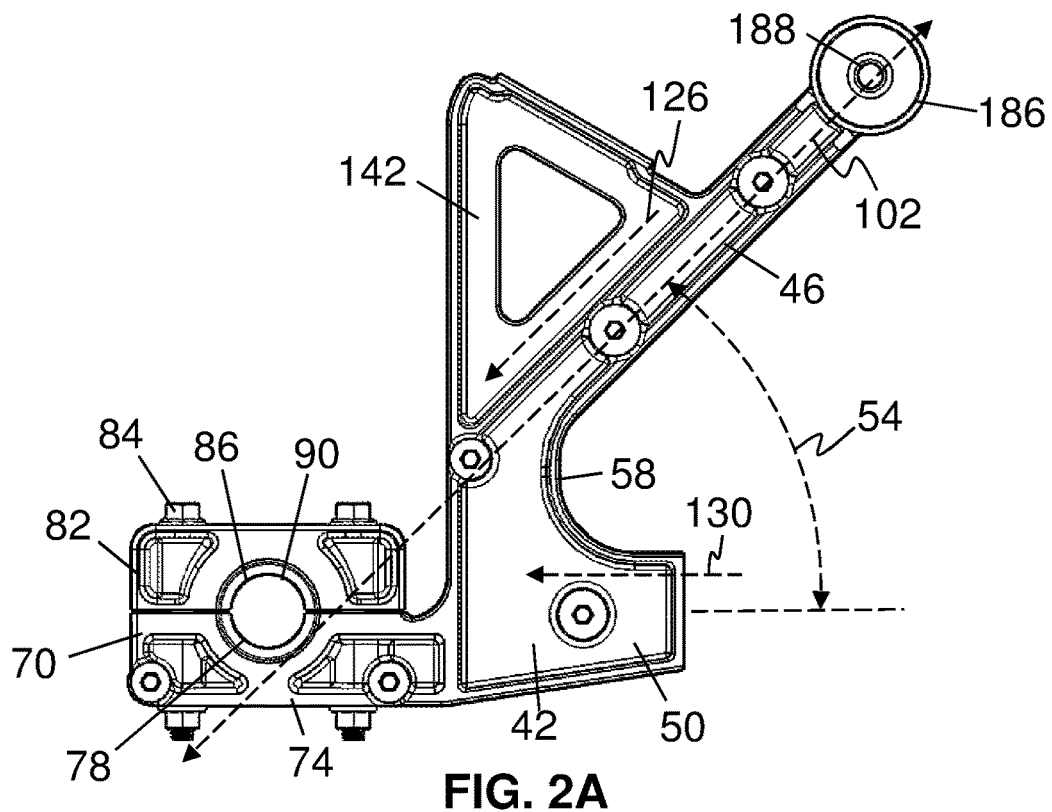
FIG. 2A is a front view of a frame, which may be suitable for use in some embodiments of the present apparatuses.
Figure 2B:
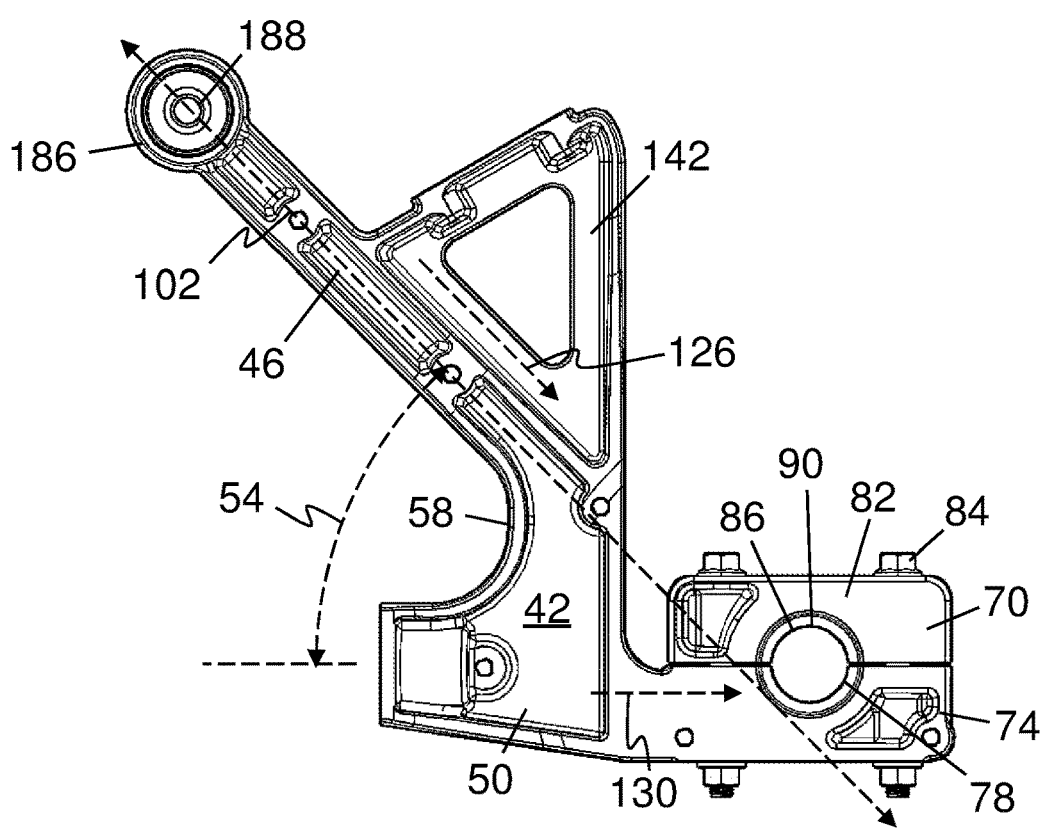
FIG. 2B is a back view of the frame of FIG. 2A.
Figure 2C:
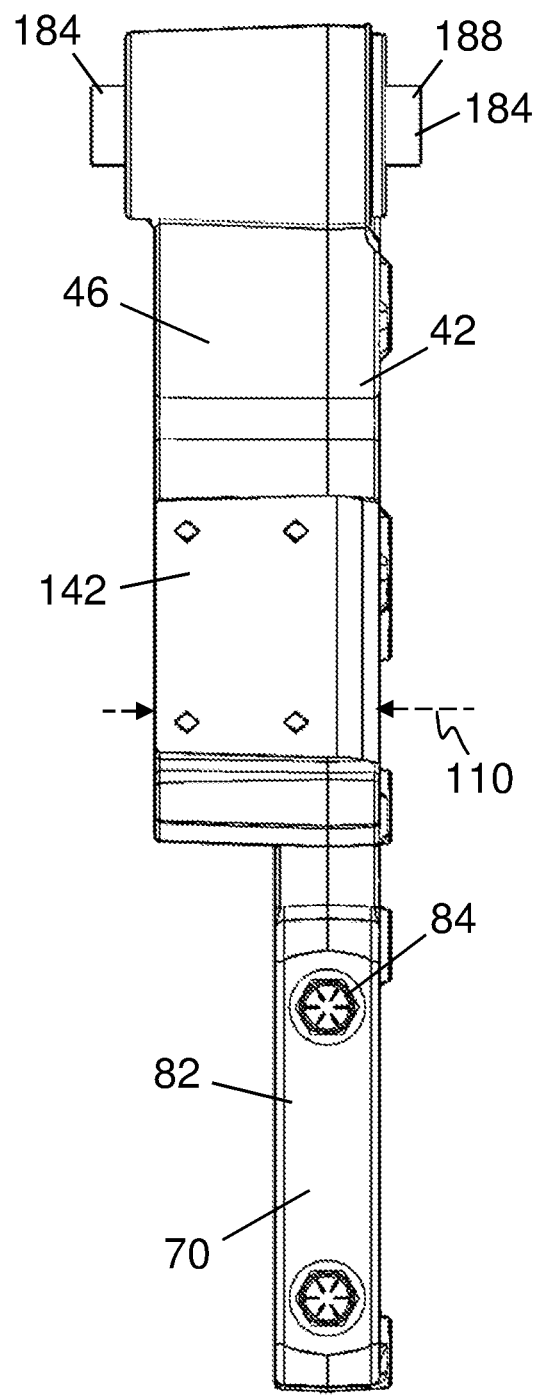
FIGS. 2C and 2D are top and bottom views, respectively, of the frame of FIG. 2A.
Figure 2D:
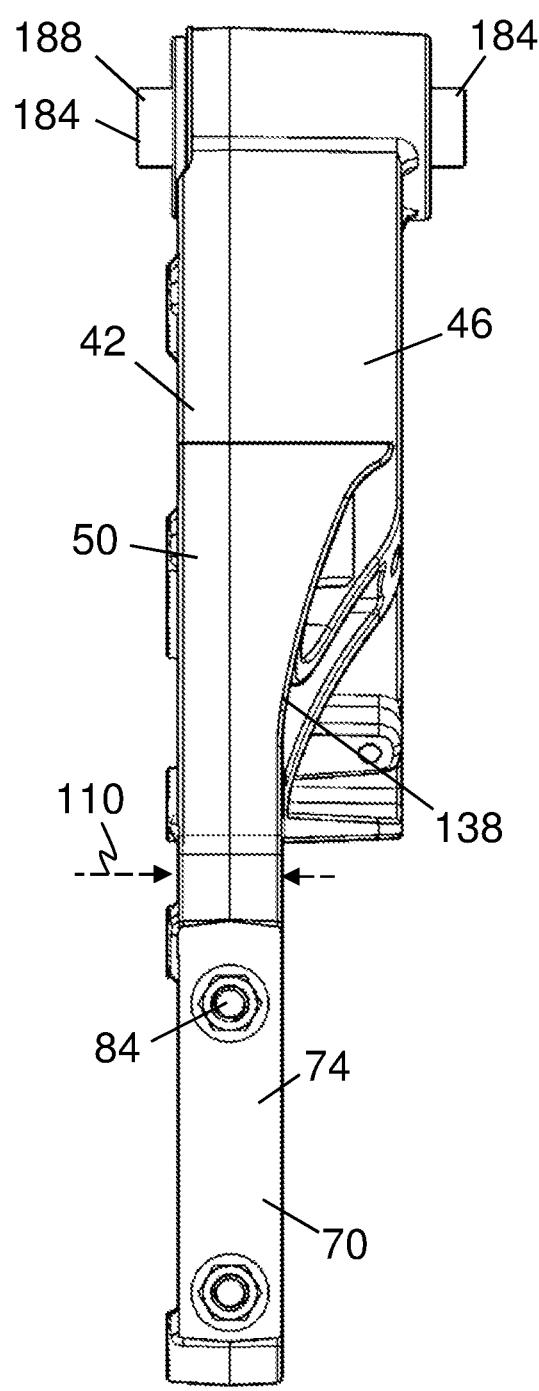
Figure 2E:
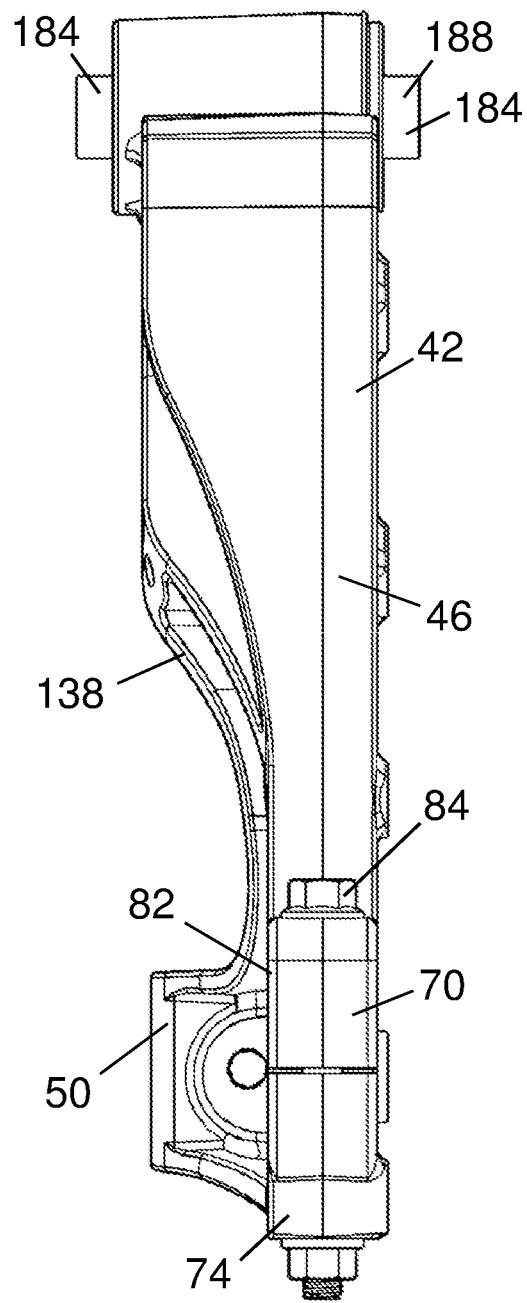
FIGS. 2E and 2F are opposing side views of the frame of FIG. 2A.
Figure 2F:
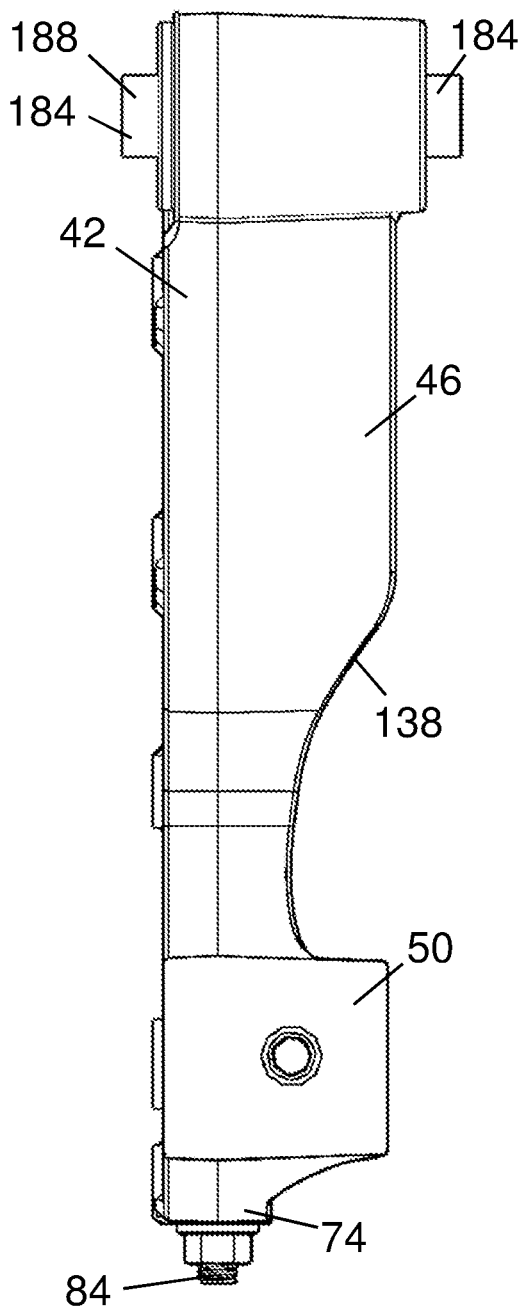
Figure 3C:
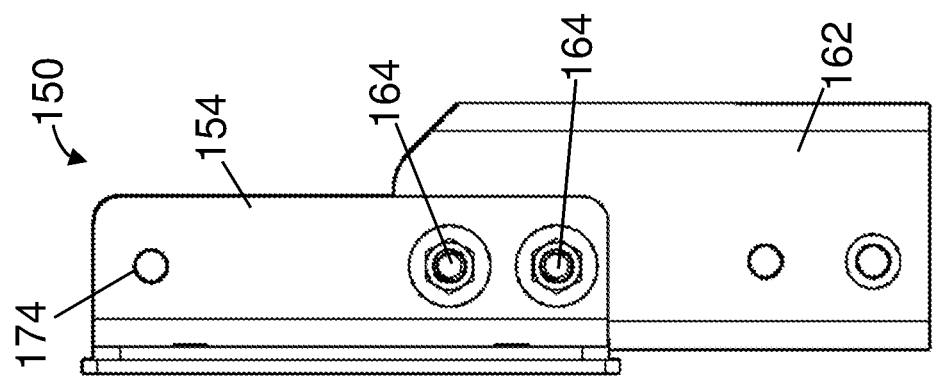
FIGS. 3B and 3C are front and back views, respectively, of the frame mount of FIG. 3A.
Figure 3B:
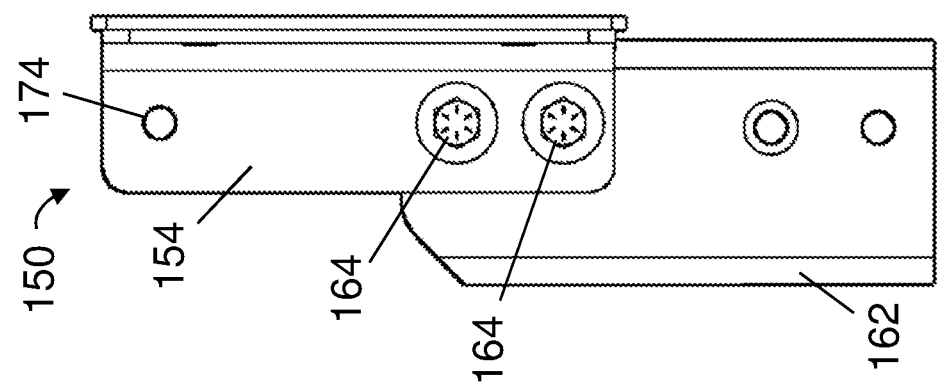
Figure 3A:
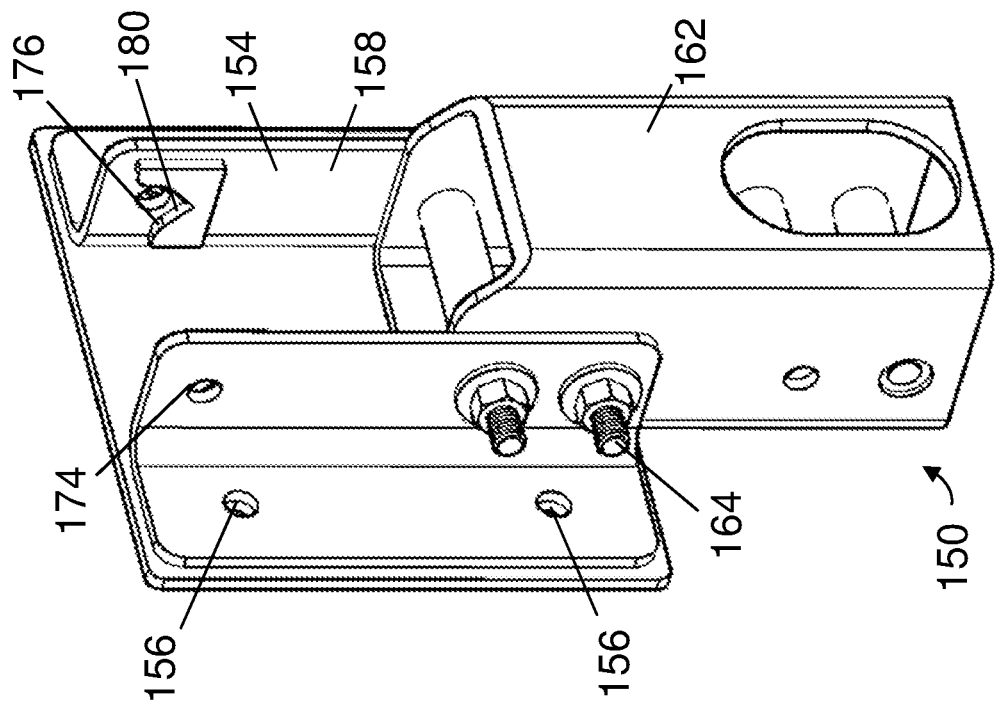
FIG. 3A is a perspective view of a frame mount, which may be suitable for use in some embodiments of the present apparatuses.
Figure 3D:
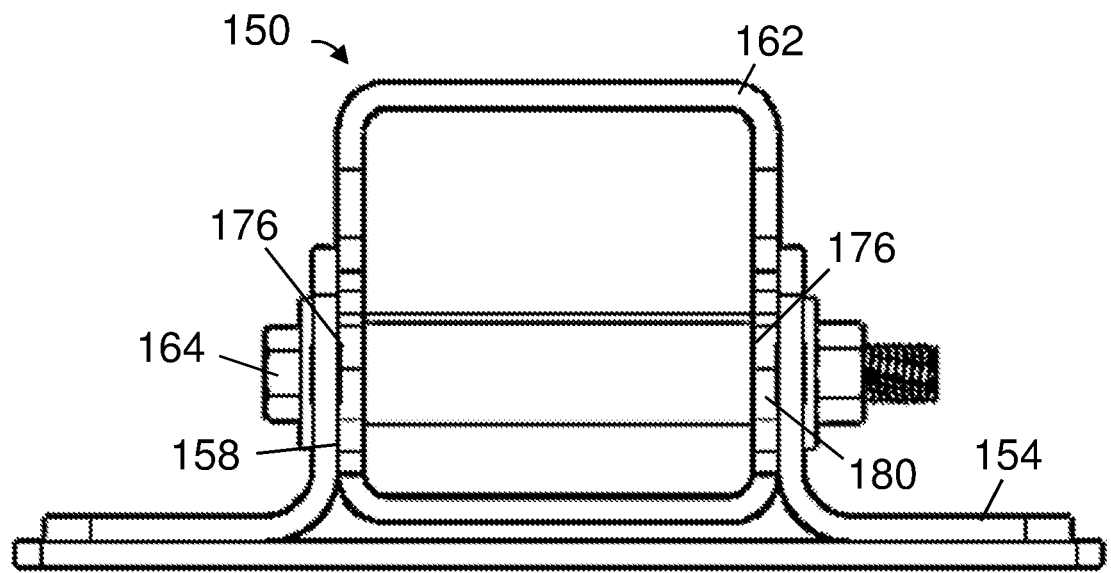
FIGS. 3D and 3E are top and bottom views, respectively, of the frame mount of FIG. 3A.
Figure 3E:
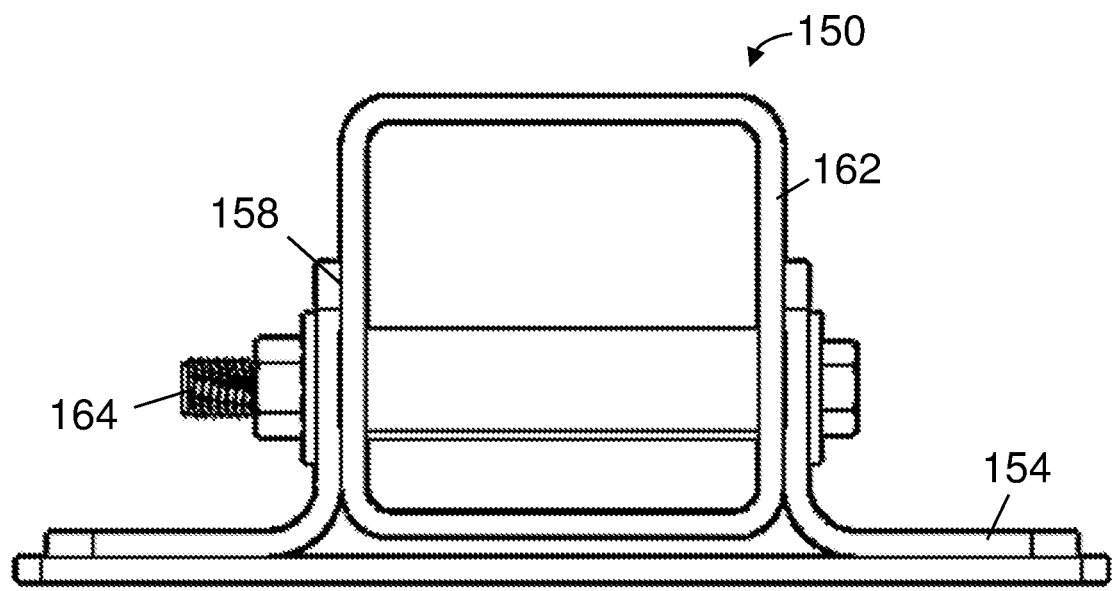
Figure 3G:
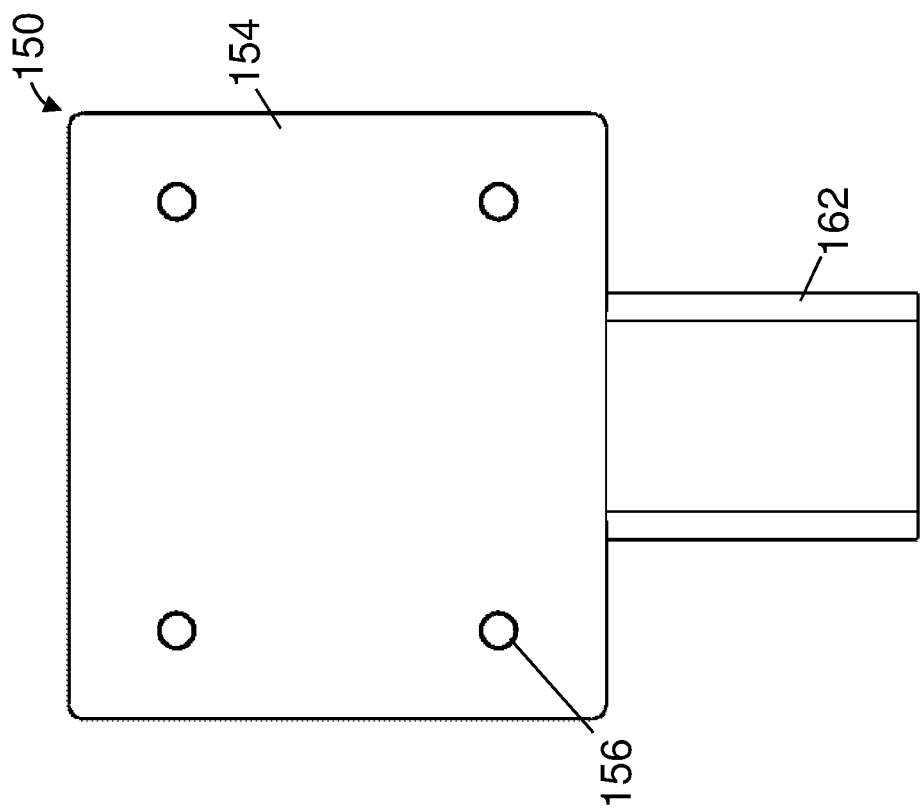
FIGS. 3F and 3G are opposing side views of the frame mount of FIG. 3A.
Figure 3F:
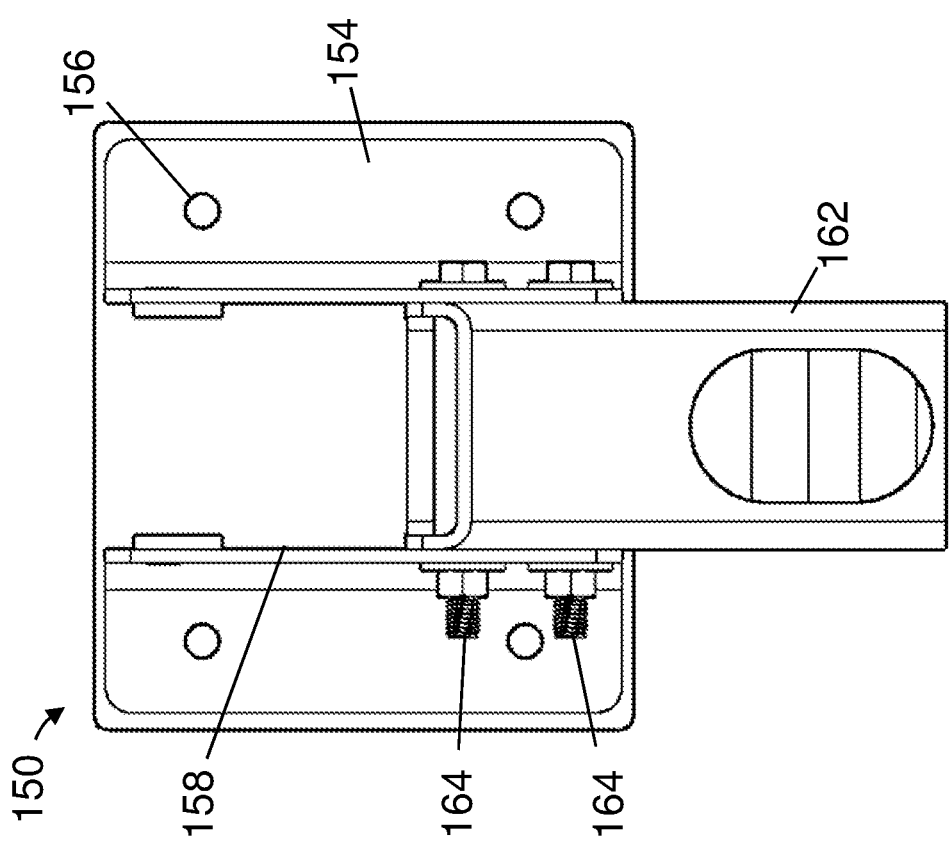
Figure 4A:
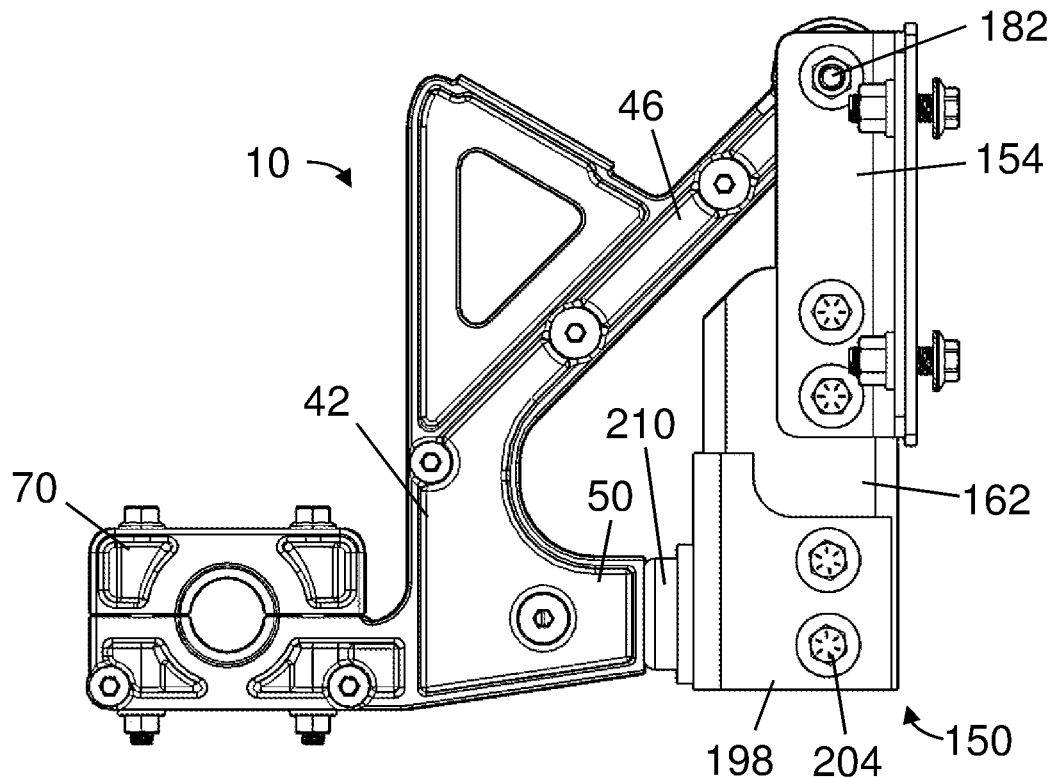
FIG. 4A is a front view of the apparatus of FIG. 1A.
Figure 4B:
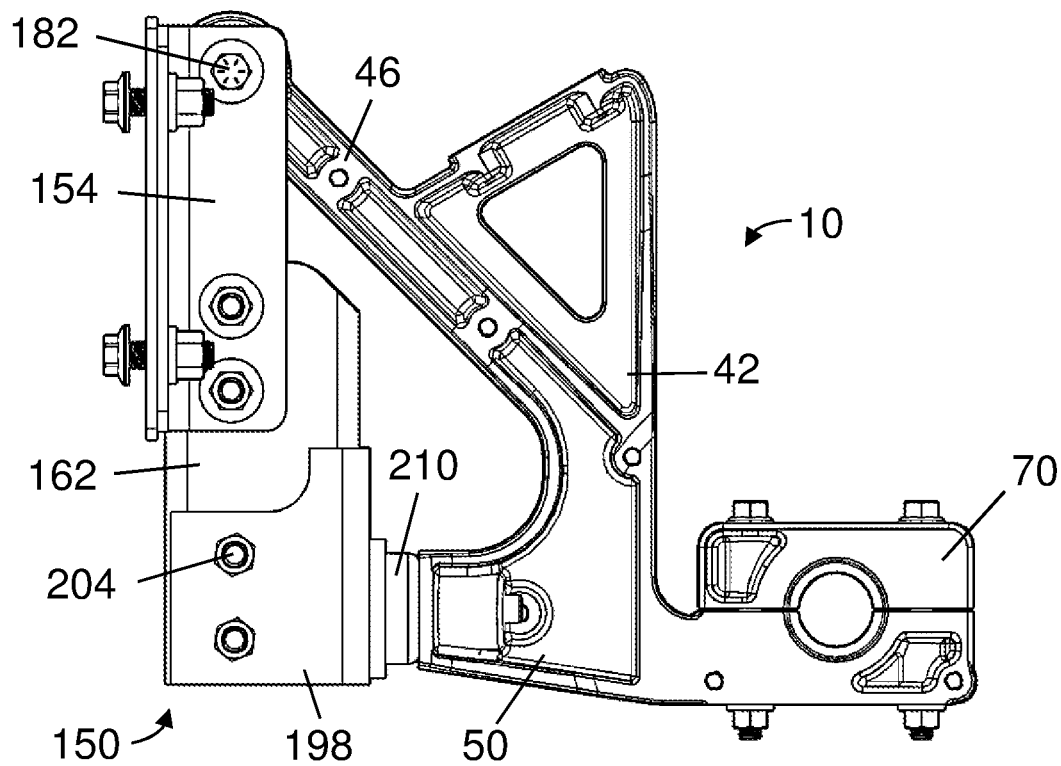
FIG. 4B is a back view of the apparatus of FIG. 1A.
Figures 4C, 4D:
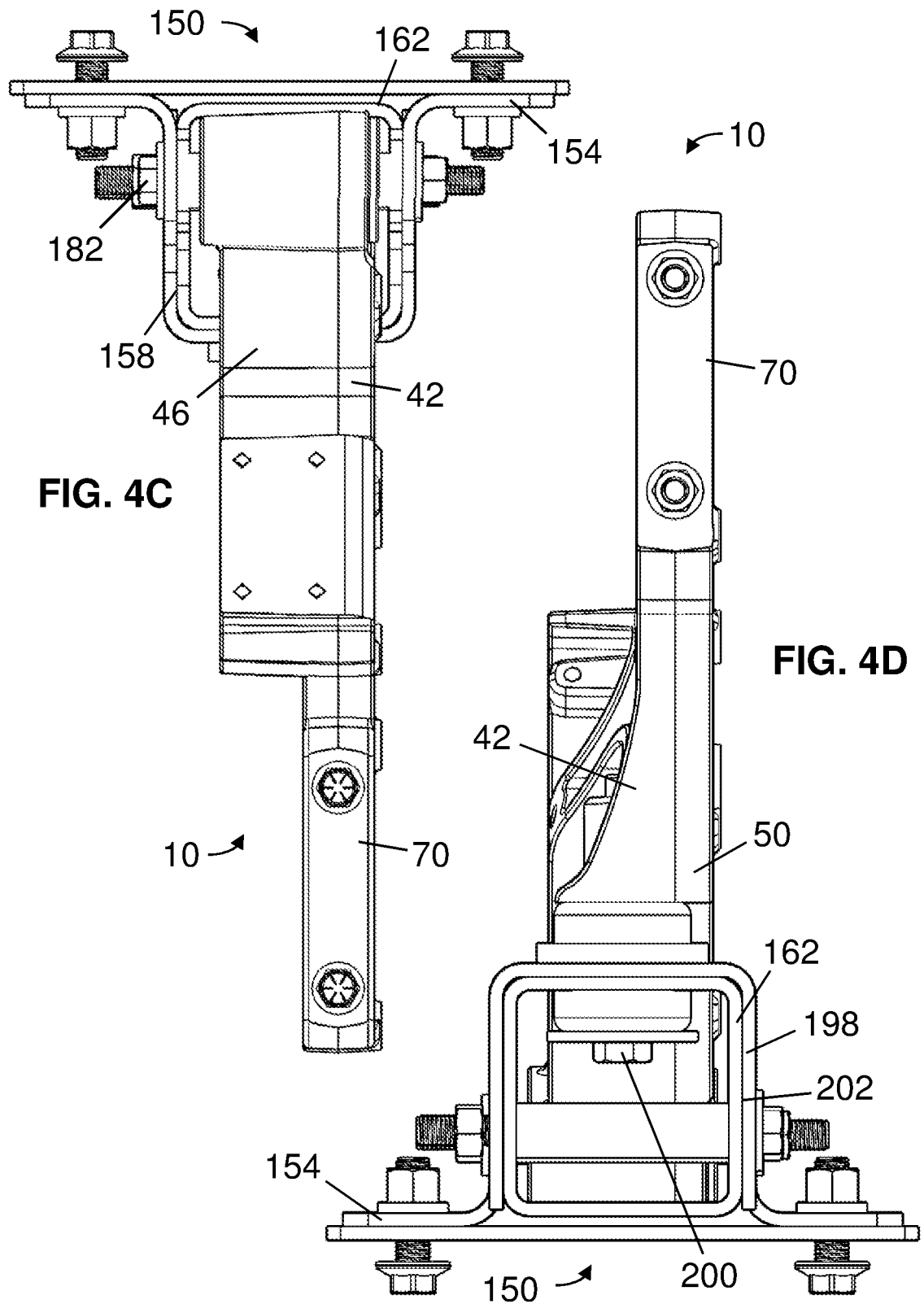
FIGS. 4C and 4D are top and bottom views, respectively, of the apparatus of FIG. 1A.

Referring now to the figures, and more particularly to FIGS. 1A and 1B, shown therein and designated by the reference numeral 10 is a first embodiment of the present apparatuses. In the embodiment shown, and as will be described in detail below, apparatus 10 is configured to mount a tank 14 to a vehicle 18 (e.g., a frame of the vehicle, as shown). For example, in this embodiment, two apparatuses 10 are each coupled to vehicle 18 and to a respective end of tank 14 to mount the tank to the vehicle. The present apparatuses (e.g., 10) can be configured to mount any suitable tank (e.g., a compressed natural gas tank, liquefied natural gas tank, gas tank, diesel tank, propane tank, water tank, and/or the like) to any suitable vehicle (e.g., a truck, car, tractor, fork-lift, and/or the like, whether configured for manned or unmanned operation). In the depicted embodiment, apparatus 10 is configured to mount tank 14 to vehicle 18 such that a longitudinal axis 22 of the tank is substantially parallel to a longitudinal axis 26 of a frame of vehicle 18 to which the tank is mounted (e.g., apparatus 10 is configured to mount a tank to a vehicle in a side-mount configuration).

Referring additionally to FIGS. 2A-2F, in the embodiment shown, apparatus 10 includes a frame 42. In this embodiment, frame 42 comprises a (e.g., rigid) first support 46 and a (e.g., rigid) second support 50. In the depicted embodiment, first support 46 and/or second support 50 comprise cantilever supports. For example, in the embodiment shown, first support 46 and/or second support 50 are configured to be coupled to and supported by vehicle 18 on a respective first end of the support, but not on a respective second end of the support that is opposite the respective first end of the support. In other words, in this embodiment, first support 46 and/or second support 50 are configured to be supported by vehicle 18 on only one end of the support. In the depicted embodiment, first support 46 is angularly disposed at a non-parallel angle 54 relative to second support 50 (e.g., such that the first support and second support form a triangulated structure, for example, with tank mount 70 disposed proximate an apex of the triangulated structure, which may enhance a stiffness and/or strength associated with apparatus 10 and/or frame 42). In the embodiment shown, frame 42 defines an opening or recess 58 between first support 46 and second support 50 (e.g., to reduce a weight of frame 42 and/or to provide a space through which components, such as, for example, fluid and/or gas lines, wiring, and/or the like may be passed and/or retained).

In this embodiment, frame 42 defines at least a portion of a rigid tank mount 70 configured to be coupled to tank 14. For example, in the embodiment shown, tank mount 70 includes a first portion 74 (e.g., defined by frame 42) that defines a first recess 78 configured to receive a neck of tank 14 (e.g., a relatively narrow portion of the tank that extends outwardly from a body of the tank). In this embodiment, first portion 74 of tank mount 70 is defined by frame 42 in fixed relation relative to first support 46 and second support 50. In the depicted embodiment, apparatus 10, and more particularly, tank mount 70, comprises a second portion or cap 82 configured to be coupled to first portion 74 (e.g., via one or more fasteners 84) to retain tank 14 between the second portion or cap and the first portion. For example, in the depicted embodiment, second portion or cap 82 defines a second recess 86 configured to cooperate with first recess 78 of first portion 74 to define an opening 90 that may surround a neck of tank 14 when the second portion or cap is coupled to the first portion.

In the embodiment shown, tank mount 70 is laterally offset from first support 46 and second support 50 In this embodiment, first support 46 is configured to extend away from vehicle 18 and towards tank mount 70 in a first direction, and second support 50 is configured to extend away from the vehicle and towards the tank mount in a second direction, where lateral components of the first and second directions are codirectional (e.g., though the first support and the second support need not extend a same distance along the lateral components of the first and second directions, respectively). In this embodiment, frame 42 tapers in a maximum thickness 110 in a direction from first support 46 and towards tank mount 70 (e.g., to reduce a weight of frame 42 and/or to define curved recess 138, described below, which may be configured to receive at least a portion of tank 14 when the tank is coupled to the tank mount).

In this embodiment, tank mount 70 is configured (e.g., via opening 90) to retain tank 14 relative to frame 42 independently of vehicle 18 and/or independently of the position of the frame relative to the vehicle (e.g., described in more detail below). In this way, tank 14 may be coupled to tank mount 70 (e.g., between first portion 74 and second portion or cap 82) without coupling first support 46 and/or second support 50 of frame 42 to vehicle 18, and/or the first support and/or second support of the frame may be coupled to the vehicle without coupling the tank to the tank mount (e.g., to facilitate installation of the frame to the vehicle and/or installation of the tank into the tank mount). In the depicted embodiment, apparatus 10, and more particularly, tank mount 70 is configured to retain tank 14 relative to frame 42 such that longitudinal axis 22 of tank 14 is perpendicular to a direction (e.g., generally indicated by arrow 126) from first support 46 of the frame and towards the tank mount (e.g., such that longitudinal axis 22 of tank 14 is perpendicular to longitudinal axis 102 of first support 46). In the embodiment shown, no portion of frame 42 extends laterally beyond tank 14 in a direction (e.g., generally indicated by arrow 130) from second support 50 and towards tank mount 70 when the tank is coupled to the tank mount.

In this embodiment, frame 42 defines a curved recess 138 configured to correspond to an outer surface of tank 14 (e.g., configured to match or substantially match a curvature of an outer surface of tank 14) (e.g., such that apparatus 10, and more particularly, frame 42, may be configured to provide a degree of lateral support to portions of the tank other than the neck of the tank when the tank is coupled to tank mount 70, facilitate the mounting of tanks having increased external dimensions and/or interior volumes, and/or the like). In the depicted embodiment, frame 42 defines a mount 142, to which a protective enclosure or shield for apparatus 10 may be mounted.

Referring additionally to FIGS. 3A-3G, in the embodiment shown, apparatus 10 comprises a frame mount 150 configured to be coupled between frame 42 and vehicle 18. For example, in this embodiment, frame mount 150 comprises a flange 154 configured to be coupled to vehicle 18. In the depicted embodiment, flange 154 is configured to be coupled to vehicle 18 via one or more fasteners disposed through one or more openings 156; however, in other embodiments of the present apparatuses (e.g., 10), a flange (e.g., 154) of a respective frame mount (e.g., 150) may be coupled to a vehicle (e.g., 18) in any suitable fashion, such as, for example, via interlocking features of the flange and/or vehicle, welding, integral formation of at least a portion of the flange and a portion of the vehicle, and/or the like. In the embodiment shown, flange 154 defines a recess or channel 158, which may be configured to receive portions of frame 42, other portions of frame mount 150, and/or the like.

In the embodiment shown, frame mount 150 comprises a (e.g., tubular) post 162 configured to be coupled to flange 154 (e.g., such that the post is at least partially disposed within recess or channel 158 of the flange) such that the post extends (e.g., longitudinally) away from the flange. In this embodiment, post 162 is configured to be coupled to flange 154 via one or more fasteners 164; however, in other embodiments of the present apparatuses (e.g., 10), a post (e.g., 162) of a respective frame mount (e.g., 150) may be coupled to a flange (e.g., 154) of the respective frame mount in any suitable fashion, such as, for example, via interlocking features of the post and/or flange, welding, integral formation of at least a portion of the post and at least a portion of the flange, and/or the like.

Figure 6B:
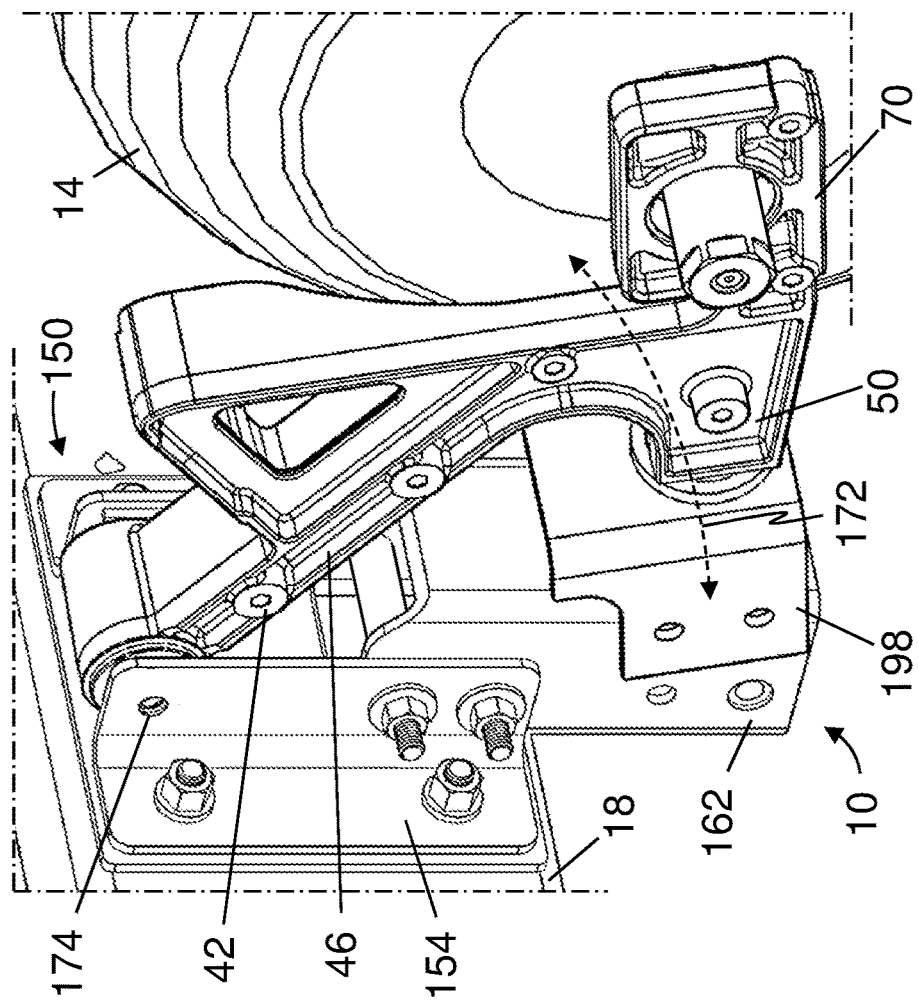
FIGS. 6A-6C illustrate steps of one embodiment of the present methods for coupling a tank to a vehicle using the apparatus of FIG. 1A
Figure 6A:
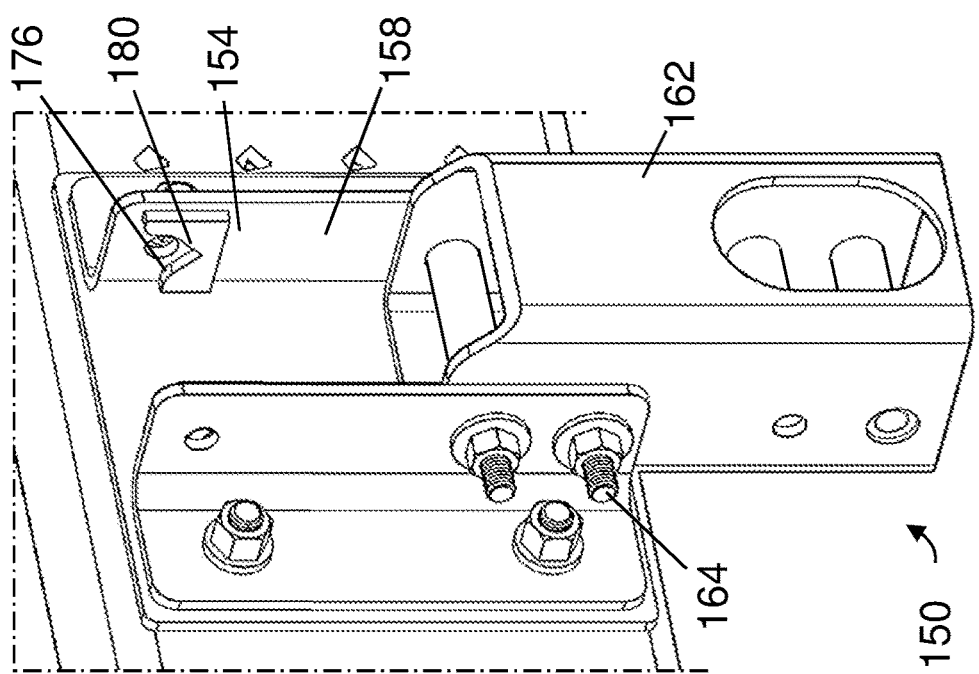
Figure 6C:
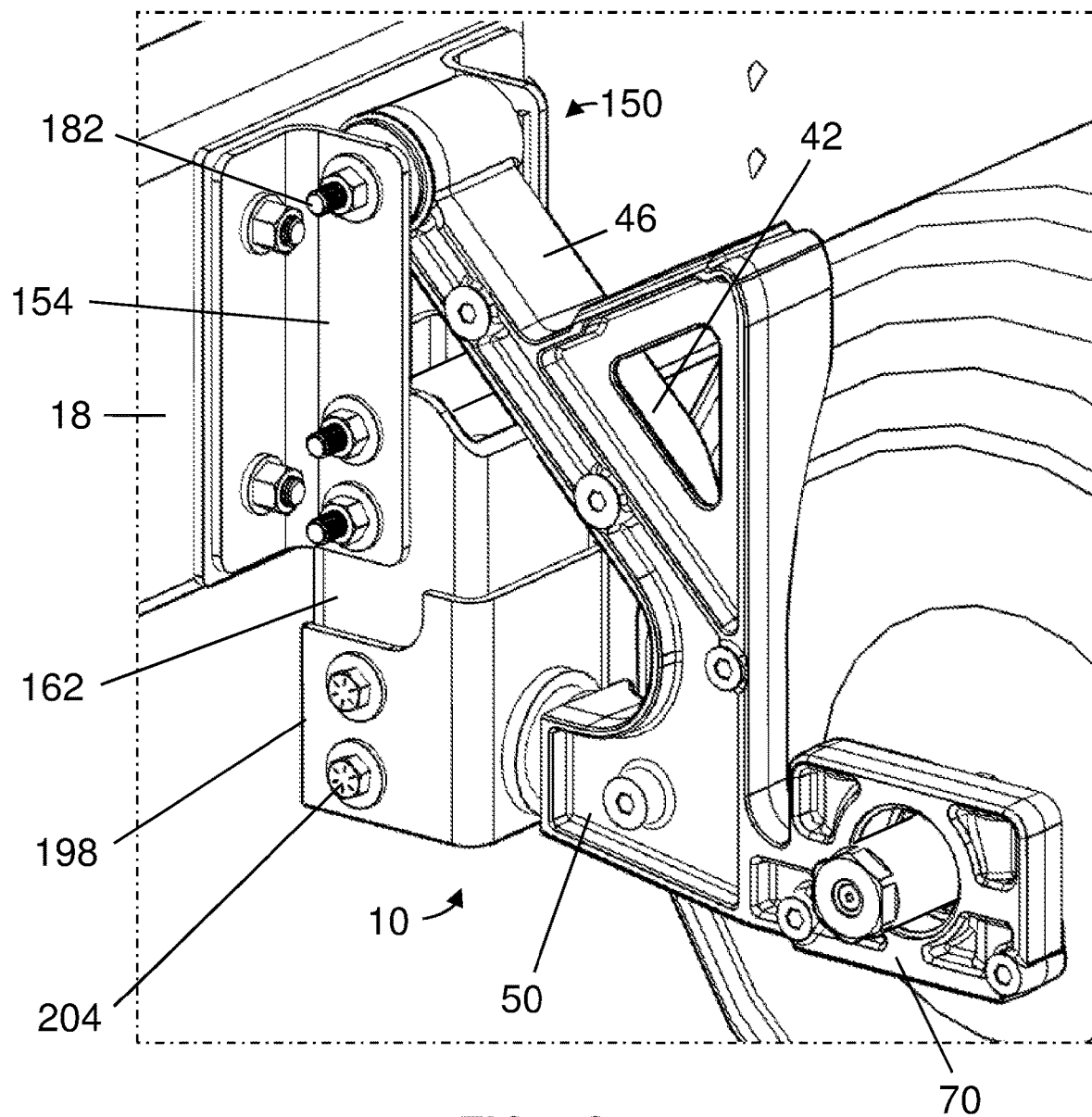

Referring additionally to FIGS. 4A-6C, in the depicted embodiment, frame 42 and frame mount 150 are configured to facilitate installation of the frame (e.g., and tank 14, if coupled to the frame) to vehicle 18. For example, in the embodiment shown, first support 46 of frame 42 is configured to be pivotally coupled to frame mount 150 such that the frame is movable (e.g., generally along a direction indicated by arrow 172) relative to vehicle 18 between a first position, in which second support 50 is spaced apart from the vehicle (FIGS. 5A and 6B), and a second position, in which the second support is coupled to the vehicle (FIGS. 5B and 6C). In this way, frame 42 may be (e.g., initially) coupled to vehicle 18 such that the frame is in the first position, thus providing for increased clearance between the frame, frame mount 150, vehicle 18, tank 14, and/or the like during such coupling, after which the frame may be moved to the second (e.g., fully installed) position.

More particularly, in this embodiment, first support 46 is configured to be pivotally coupled to flange 154 of frame mount 150. For example, in the depicted embodiment, channel 158 of flange 154 includes one or more support surfaces 176 configured to support first support 46 relative to the flange, while allowing frame 42 to move between the first and second positions. In the embodiment shown, each of one or more support surfaces 176 of flange 154 defines a recess or notch 180 that is open toward an upper end of the flange. In this embodiment, first support 46 includes one or more protrusions 184, each configured (e.g., sized) to be received by recess or notch 180 of a corresponding one of one or more support surfaces 176 to pivotally couple frame 42 to frame mount 150. In the depicted embodiment, each recess or notch 180 has a V-shaped profile; however, in other embodiments, a recess or notch (e.g., 180) of a respective support surface (e.g., 176) may include any suitable profile, such as, for example, a circular or elliptical profile. In the embodiment shown, one or more protrusions 184 comprises two protrusions, each defined by opposing ends of a shaft 188 disposable through first support 46.

In this embodiment, flange 154 defines an opening 174 configured to receive a fastener 182 such that the fastener may be disposed through the opening and into an opening 186 of first support 46, thereby (e.g., further) securing the first support to frame mount 150. In the depicted embodiment, opening 186 of first support 46 may be defined through shaft 188, such that, for example, the shaft may be characterized as a sleeve. In the embodiment shown, opening 174 of flange 154 is a bounded opening (e.g., comprises a closed perimeter), which may prevent first support 46 from being decoupled from the flange when fastener 182 is disposed through the opening and into opening 186 of the first support. In this embodiment, fastener 182 may be disposed through flange 154 and into first support 46 whether frame 42 is in the first position or the second position.

In the embodiment shown, when frame 42 is in the second position, second support 50 is configured to be coupled to vehicle 18 via post 162. For example, in this embodiment, apparatus 10 comprises a receiver 198 configured to be coupled to second support 50 and to receive at least a portion of post 162 when frame 42 is in the second position. More particularly, in the depicted embodiment, receiver 198 defines a recess or channel 202 configured to receive at least a portion of post 162 when frame 42 is in the second position. In the depicted embodiment, receiver 198 is configured to be coupled to second support via one or more fasteners 200; however, in other embodiments of the present apparatuses (e.g., 10), a respective receiver (e.g., 198) may be coupled to a respective frame (e.g., 42) in any suitable fashion, such as, for example, via interlocking features of the receiver and/or the frame, welding, integral formation of at least a portion of the receiver and at least a portion of the frame, and/or the like.

To illustrate, in the embodiment shown, frame mount 150 (e.g., including flange 154 and post 162) may be coupled to vehicle 18 (e.g., FIG. 6A). In this embodiment, first support 46 may be pivotally coupled to frame mount 150, via, for example, one or more protrusions 184 received by one or more recesses or notches 180 of one or more support surfaces 176 (e.g., with the frame in the first position, as shown in FIG. 6B). In the depicted embodiment, frame 42, if not in the second position, may be moved to the second position (e.g., FIG. 6C) to couple second support 50 to vehicle 18. In this embodiment, post 162 is coupled to flange 154 of frame mount 150 such that, during movement of frame 42 from the first position to the second position, post 162 is received by receiver 198; however, in other embodiments, a post (e.g., 162) of a respective frame mount (e.g., 150) may be coupled to a respective receiver (e.g., 198), such that, during movement of a respective frame (e.g., 42) from a first position (e.g., FIG. 6B) to a second position (e.g., FIG. 6C), the post is received by a flange (e.g., 154) of the frame mount. In the depicted embodiment, first support 46 may be (e.g., further) secured relative to frame mount 150 via fastener 82, whether the frame is in the first position or second position. In the embodiment shown, receiver 198 may be (e.g., further) secured relative to post 162 via one or more fasteners 204.

For example, some embodiments of the present methods comprise coupling a frame mount (e.g., 150) to a vehicle (e.g., 18), the frame mount having a flange (e.g., 154) defining a bounded opening (e.g., 174) and a post (e.g., 162) extending from the flange and away from the opening (e.g., FIG. 6A), coupling a first support (e.g., 46) of a frame (e.g., 42) to the flange, the frame further defining a second support (e.g., 50) and a rigid tank mount (e.g., 70) laterally offset from the first support and the second support (e.g., FIG. 6B), and pivoting the frame relative to the vehicle to couple the second support of the frame to the post (e.g., FIG. 6C). Some methods comprise disposing a fastener (e.g., 182) through the opening of the flange and into the first support of the frame. Some methods comprise coupling a tank (e.g., 14) to the tank mount.

In this embodiment, apparatus 10 comprises one or more resilient components configured to be disposed between at least one of first support 46 and vehicle 18 and second support 50 and the vehicle. Resilient components of the present apparatuses (e.g., 10) can comprise any suitable resilient material, such as, for example, rubber, Delrin, other polymers, aluminum, other metals, and/or the like. For example, in the depicted embodiment, apparatus 10 comprises a resilient bushing 206 configured to be disposed between first support 46 and vehicle 18 (e.g., between the first support and flange 154). For further example, in the depicted embodiment, apparatus 10 comprises a damper 210 (described in more detail below) configured to be disposed between second support 50 and vehicle 18 (e.g., between the second support and post 162). In this way, apparatus 10 may be configured to reduce a magnitude of vibrations, shocks, and/or the like that tank 14 or related components may experience (e.g., as vehicle 18 is in use).

Figure 7:
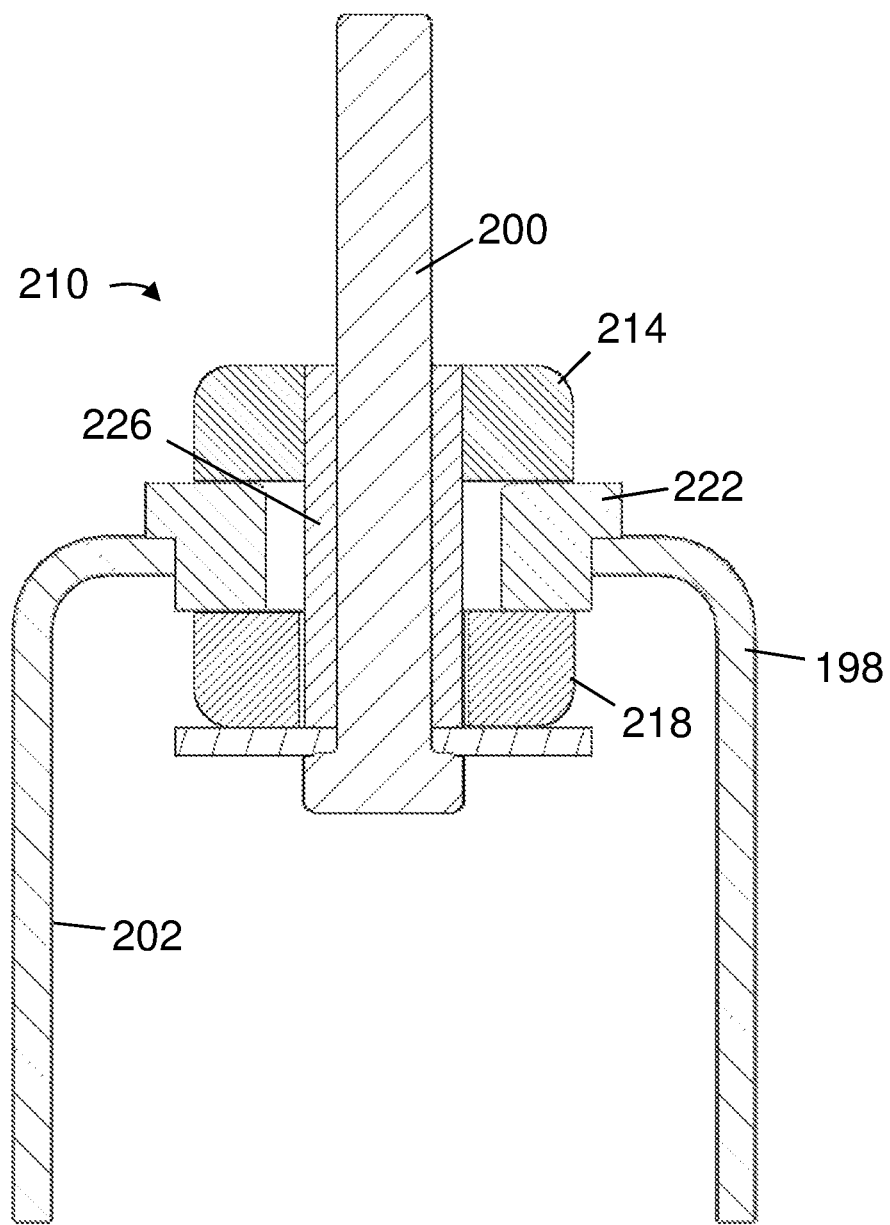
FIG. 7 is a cross-sectional bottom view of a damper, which may be suitable for use in some embodiments of the present apparatuses.

For example, and referring additionally to FIG. 7, in the embodiment shown, damper 210 comprises one or more resilient members configured to be disposed at an interface between second support 50 and receiver 198 (e.g., such that loads experienced by frame 42 may be transmitted to the receiver at least partially through the one or more resilient members). For example, in this embodiment, receiver 198, and more particularly, a retaining member and/or spacer 222 coupled to the receiver, is configured to be disposed between a first resilient bushing 214 and a second resilient bushing 218. In the depicted embodiment, fastener 200 is configured to be disposed through second bushing 218, through receiver 198, through first bushing 214, and into and/or through second support 50 of frame 42 to couple the receiver to the second support of the frame. In the embodiment shown, a sleeve 226 may be disposed between and/or through first bushing 214 and/or second bushing 218 (e.g., to prevent undesirable deformation of the first bushing and/or second bushing that might otherwise occur, for example, when tightening fastener 200 to couple receiver 198 to second support 50 of frame 42).

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. An apparatus for mounting a tank to a vehicle, the apparatus comprising:
a frame defining:
a first support;
a second support; and
at least a portion of a rigid tank mount in fixed relation relative to and laterally offset from the first support and the second support, the tank mount defining an opening configured to receive a tank, the opening having a maximum transverse dimension measured between portions of the tank mount;
where the first support is configured to be pivotally coupled to a vehicle frame at a pivot point such that the frame is movable relative to the vehicle frame between a first position in which the second support is spaced apart from the vehicle frame and a second position in which the second support is coupled to the vehicle frame;
where a minimum distance between the pivot point and the opening of the tank mount is larger than the maximum transverse dimension of the opening of the tank mount; and
where the frame defines a curved recess configured to correspond to an outer surface of the tank.

2. The apparatus of claim 1, comprising one or more resilient components configured to be disposed between at least one of: the first support and the vehicle frame and the second support and the vehicle frame.

3. The apparatus of claim 2, where the one or more resilient components comprises:
a bushing configured to be disposed between the first support and the vehicle frame; and/or
a damper configured to be disposed between the second support and the vehicle frame.

4. The apparatus of claim 1, comprising:
a frame mount configured to be coupled between the frame and the vehicle frame, the frame mount comprising:
a flange configured to be coupled to the vehicle frame, the flange defining a bounded opening configured to receive a fastener; and
a post extending from the flange and away from the opening;
where the first support is configured to be pivotally coupled to the vehicle frame via the fastener, and, when the frame is in the second position, the second support is coupled to the post.

5. The apparatus of claim 1, where:
the first support comprises a cantilever support; and
the second support comprises a cantilever support.

6. The apparatus of claim 4, where:
the flange defines a channel configured to receive the first support; and
the flange includes one or more support surfaces disposed within the channel, the one or more support surfaces configured to support the first support relative to the flange independently of the fastener.

7. The apparatus of claim 4, comprising:
a receiver configured to be coupled to the second support;
where the receiver is configured to receive at least a portion of the post when the frame is in the second position.

8. The apparatus of claim 7, where the receiver defines a channel configured to receive at least a portion of the post.

9. The apparatus of claim 1, where no portion of the frame extends laterally beyond the tank in a direction from the second support and towards the tank mount when the tank is coupled to the tank mount.

10. The apparatus of claim 1, where the first support is angularly disposed at a non-parallel angle relative to the second support.

11. The apparatus of claim 1, where the first support and the second support are rigid.

12. The apparatus of claim 1, where the opening of the tank mount is configured to surround a neck of the tank.

13. The apparatus of claim 1, where the tank mount is configured to retain the tank relative to the frame independently of the position of the frame relative to the vehicle frame.

14. The apparatus of claim 1, where the tank mount is configured to retain the tank relative to the frame such that a longitudinal axis of the tank is perpendicular to a direction from the first support and towards the tank mount.

* * * * *